(12) United States Patent
Ishitaka

(10) Patent No.: US 6,693,683 B2
(45) Date of Patent: Feb. 17, 2004

(54) PHOTO-CONDUCTOR PLATE REDUCED IN LIGHT REFLECTION, AND SURFACE EMITTING DEVICE AND LIQUID CRYSTAL DISPLAY UNIT USING IT

(75) Inventor: Yoshihiko Ishitaka, Fukushima-ken (JP)

(73) Assignee: Alps Electric Co., Ltd., Tokyo (JP)

(*) Notice: Subject to any disclaimer, the term of this patent is extended or adjusted under 35 U.S.C. 154(b) by 74 days.

(21) Appl. No.: 10/016,749

(22) Filed: Oct. 30, 2001

(65) Prior Publication Data
US 2002/0057399 A1 May 16, 2002

(30) Foreign Application Priority Data
Oct. 31, 2000 (JP) .................................. 2000-333766

(51) Int. Cl.[7] .................................................. G02F 1/13
(52) U.S. Cl. ..................................... 349/65; 362/31
(58) Field of Search ................................ 349/65; 362/31

(56) References Cited

U.S. PATENT DOCUMENTS

| 5,341,231 A | * | 8/1994 | Yamamoto et al. ............ 349/63 |
| 5,467,208 A | * | 11/1995 | Kokawa et al. ................ 349/67 |
| 5,831,697 A | * | 11/1998 | Evanicky et al. ............. 349/62 |
| 5,838,404 A | * | 11/1998 | Ozeki et al. .................. 349/65 |
| 6,053,619 A | * | 4/2000 | Nakamura et al. ............ 362/31 |
| 6,104,453 A |   | 8/2000 | Watanabe |
| 6,196,692 B1 | * | 3/2001 | Umemoto et al. ............. 362/31 |
| 6,467,923 B1 | * | 10/2002 | Umemoto ...................... 362/31 |
| 6,565,224 B1 | * | 5/2003 | Umemoto et al. ............. 362/31 |

* cited by examiner

Primary Examiner—James Dudek
(74) Attorney, Agent, or Firm—Brinks Hofer Gilson & Lione (57) ABSTRACT

A liquid crystal display unit includes a photo-conductor plate provided with a substrate having a light emission face for emitting light introduced within from a light source via a side end face and a reflection face, positioned on the other side than the light emission face, for reflecting the light propagating inside, and anti-reflection films provided over a surface of the substrate, and a liquid crystal display unit arranged opposite the light emission face of the photo-conductor plate, wherein the anti-reflection films are provided over at least the light emission face and the reflection face.

8 Claims, 8 Drawing Sheets

PHOTO-CONDUCTOR PLATE REDUCED IN LIGHT REFLECTION, AND SURFACE EMITTING DEVICE AND LIQUID CRYSTAL DISPLAY UNIT USING IT

BACKGROUND OF THE INVENTION

1. Field of the Invention

The present invention relates to a photo-conductor plate and its manufacturing method, a surface emitting device and a liquid crystal display unit, and more particularly to the structure of a photo-conductor plate excelling in light transmittance when used as the front light of a liquid crystal display unit.

2. Description of the Prior Art

Usually, in a reflectance liquid crystal display unit using ambient light as the light source for displaying, its luminance is affected by the luminous energy of the ambient light, and therefore involves the problem that the visibility of the display extremely deteriorates in a dark place or any other environment where no sufficient ambient light is available.

Figure 8:
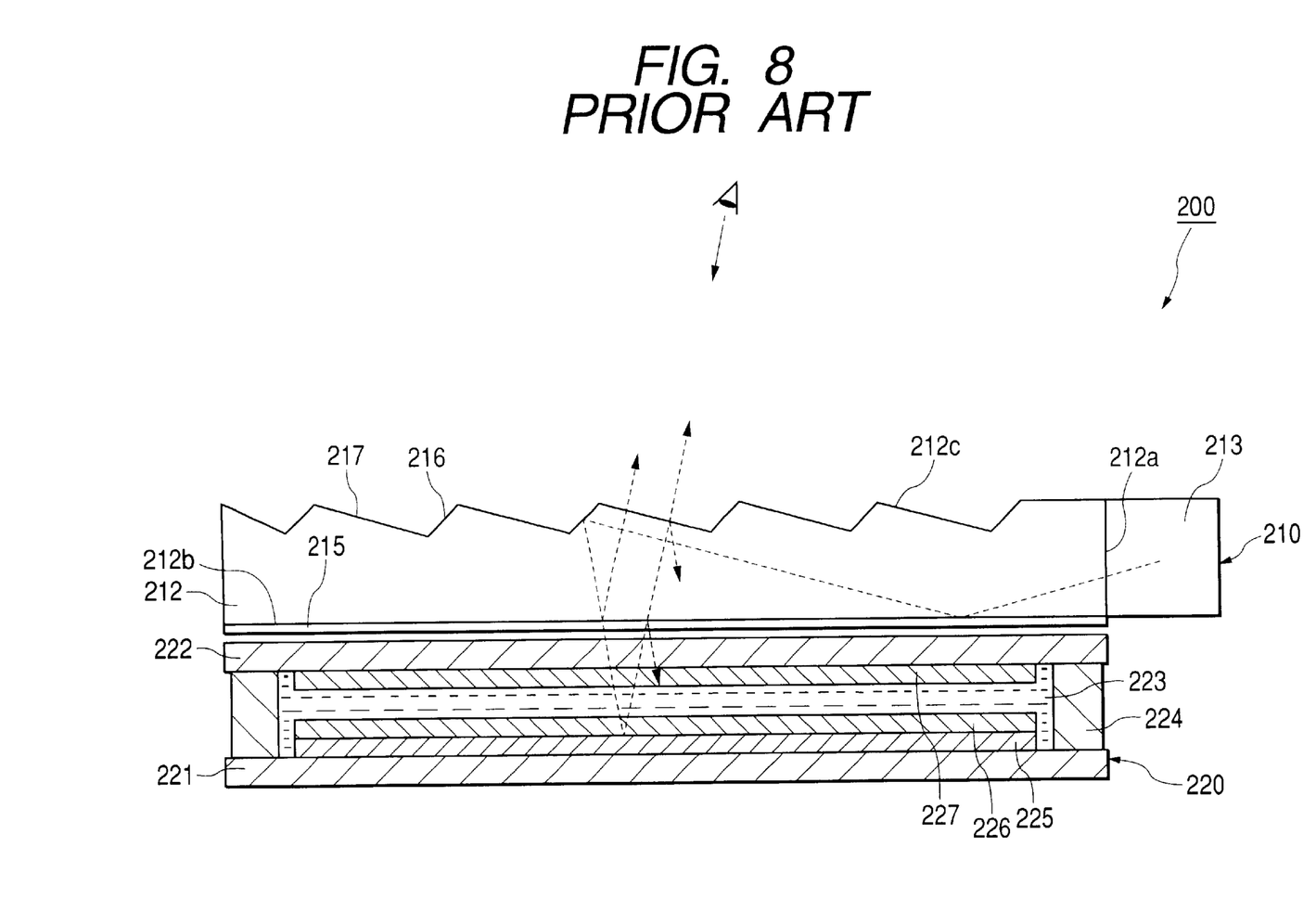
FIG. 8 shows a section of a liquid crystal display unit of a surface emitting device according to the prior art.

Accordingly, in order to solve the above-noted problem, there is proposed a liquid crystal display unit of a type in which a front light (surface emitting device) is arranged on the front side of a reflectance liquid crystal display unit for use as an auxiliary light source. This front light-equipped liquid crystal display unit operates as a usual reflectance liquid crystal display unit in an environment where sufficient ambient light is available, such as outdoors in the daytime, and the front light is turned on as required to serve as a light source. A sectional structure of an example of such a liquid crystal display unit in which a front light is arranged on the front side of a liquid crystal display unit is shown in FIG. 8. This liquid crystal display unit 200 shown in FIG. 8 is configured of a liquid crystal display unit 220 and a front light 210, and the front light 210 is arranged on the front face (top face in FIG. 8) of the liquid crystal display unit 220 so that a photo-conductor plate 212 is arranged in the display area of the liquid crystal display unit 220.

The front light 210 is configured of a photo-conductor plate 212 formed by injection molding of transparent acrylic resin or the like and a light source 213 formed of a cold-cathode tube arranged on a side end face 212a of this photo-conductor plate 212. The bottom face (the side toward the liquid crystal display unit 220) of the photo-conductor plate 212 is used as a light emission face 212b from which light is emitted. The other face (the top face of the photo-conductor plate 212) than this light emission face 212b is used as a reflection face 212c where a first slope 216 and a second slope 217 ensuing from it, formed at an inclination with respect to the light emission face 212b, are alternately and periodically arranged to alter the direction of light within the photo-conductor plate 212. To the light emission face 212b of the photo-conductor plate 212 is stuck an anti-reflection film 215.

The liquid crystal display unit 220 has a configuration in which a first substrate 221 and a second substrate 222 facing each other with a liquid crystal layer 223 pinched between them are integrated by joining with a sealing material 224. On the side of the first substrate 221 toward the liquid crystal layer 223 are successively stacked a reflection layer 225, containing a reflection film for reflecting light having come incident on the liquid crystal display unit 220, and a display circuit 226 for driving and controlling the liquid crystal layer 223, and a display circuit 227 is provided on the side of the second substrate 222 toward the liquid crystal layer 223.

In the liquid crystal display unit 200 configured as described above, light emitted from the light source 213 is introduced into the photo-conductor plate 212 via the side end face 212a of the photo-conductor plate 212, propagates within photo-conductor plate 212 and at the same time is reflected by the first slope 216 having a greater angle of inclination with respect to the direction of light introduction to undergo a change in its propagating direction toward the light emission face 212b, eventually to be emitted from the light emission face 212b. This light emitted from the light emission face 212b comes incident on the liquid crystal display unit 220 as illuminating light, passes the display circuits 226 and 227 and the liquid crystal layer 223, is reflected by the reflection layer 225, returns to outside the liquid crystal display unit 220, and is transmitted by the light emission face 212b and the reflection face 212c of the photo-conductor plate 212 to reach the observer. In this way, the display on the liquid crystal display unit 220 is recognized by the observer.

However, the front light 210 of the liquid crystal display unit 200 configured as described above involves the problem that, as the anti-reflection film 215 is provided only on the light emission face 212b of the photo-conductor plate 212, contrast is reduced by reflection from either the inside or the surface of the photo-conductor plate 212. This is due to the reason explained below.

First, with the front light 210 described above, the light coming incident from outside on the reflection face 212c of the front light 210 is reflected by this reflection face 212c and directly reaches the observer to adversely affect his or her perception of the display.

Then, the light introduced from the light source 213 into the photo-conductor plate 212 via the side end face 212a of the photo-conductor plate 212 propagates within the photo-conductor plate 212. At the same time, its propagating direction is turned toward the light emission face 212b by the first slopes 216, steeper of the slopes 216 and 217 formed on the reflection face 212c, and about 96% of the light is emitted from the light emission face 212b to illuminate the reflectance liquid crystal display unit 220. However, about 4% of it is reflected by the light emission face 212b to become reflected light directed to the reflection face 212c, passes the reflection face 212c and is emitted outside to reach the observer. Such reflected light reaches the observer without passing the liquid crystal display unit 220, and therefore does not contribute to displaying. Therefore, this reflected light is perceived by the observer as noise, and contributes to the deterioration of contrast. Furthermore, as the reflected light is generated from the light reflected by the periodically formed first slopes 216 and passes the reflection face 212c on which the slopes 216 and 217 are periodically formed to reach the observer, it involves the risk of allowing moiré fringes to be generated by interference due to the periodicity of the slopes 216 and 217.

Next, as described above, the light from the light source 213, whose propagating direction is changed by the slopes 216 formed in succession periodically on the reflection face 212c of the photo-conductor plate 212, is emitted from the light emission face 212b to illuminate the reflectance liquid crystal display unit 220. The light coming incident on this liquid crystal display unit 220 is reflected by the reflection layer 225 of the liquid crystal display unit 220 toward the front light 210, and again comes incident on the photo-conductor plate 212. Part of the light traveling from this liquid crystal display unit 220 toward the front light 210 is reflected by the light emission face 212b and the reflection face 212c of the photo-conductor plate 212 to generate light which does not contribute to displaying but invites deterioration in contrast.

SUMMARY OF THE INVENTION

An object of the present invention, attempted in view of the above-described circumstances, is to provide a liquid crystal display unit equipped with a photo-conductor plate serving to enhance light transmittance by reducing reflection of light on its emission face and reflection face and a surface emitting device provided with this photo-conductor plate to be able to achieve efficient irradiation with light, and a liquid crystal display unit providing satisfactory contrast and excelling in displaying quality.

The above-stated object can be achieved with a photo-conductor plate provided with a substrate having a light emission face for emitting light introduced within via a side end face and a reflection face, positioned on the other side than the light emission face, for reflecting light propagating inside, and anti-reflection films provided over a surface of the substrate, wherein the anti-reflection films are provided over at least the light emission face and the reflection face.

It is preferable that a reflectance of the anti-reflection films is 1% or less of a reflectance of an Al film at an optical wavelength of 550 nm.

It is preferable that the reflectance of the anti-reflection films is 2.5% or less of the Al film in an optical wavelength range of 380 nm to 780 nm. It is further preferable that the reflectance of the anti-reflection films is 1.5% or less of the Al film in an optical wavelength range of 450 nm to 700 nm.

It is preferable that a refractive index of the substrate is not less than 1.48, and a refractive index of the anti-reflection films is not more than 1.35.

It is preferable that the anti-reflection films are formed by a dip coating process.

It is preferable that the anti-reflection films are a single-layered structure.

The above-stated object can also be achieved with a surface emitting device provided with a photo-conductor plate according to the invention and a light source arranged on an incident end face of the photo-conductor plate.

The above-stated object can as well be achieved with a liquid crystal display unit provided with the surface emitting device.

DESCRIPTION OF THE PREFERRED EMBODIMENTS

Whereas preferred embodiments of the present invention will be described below with reference to accompanying drawings, the invention is not limited to these modes of implementation. The drawings referred to in describing these modes of implementation are mere aids to description of the configurations of the photo-conductor plate, surface emitting device and liquid crystal display unit, and the lengths, widths and thicknesses of these elements are different from those of the real photo-conductor plate, surface emitting device and liquid crystal display unit.

Figure 1:
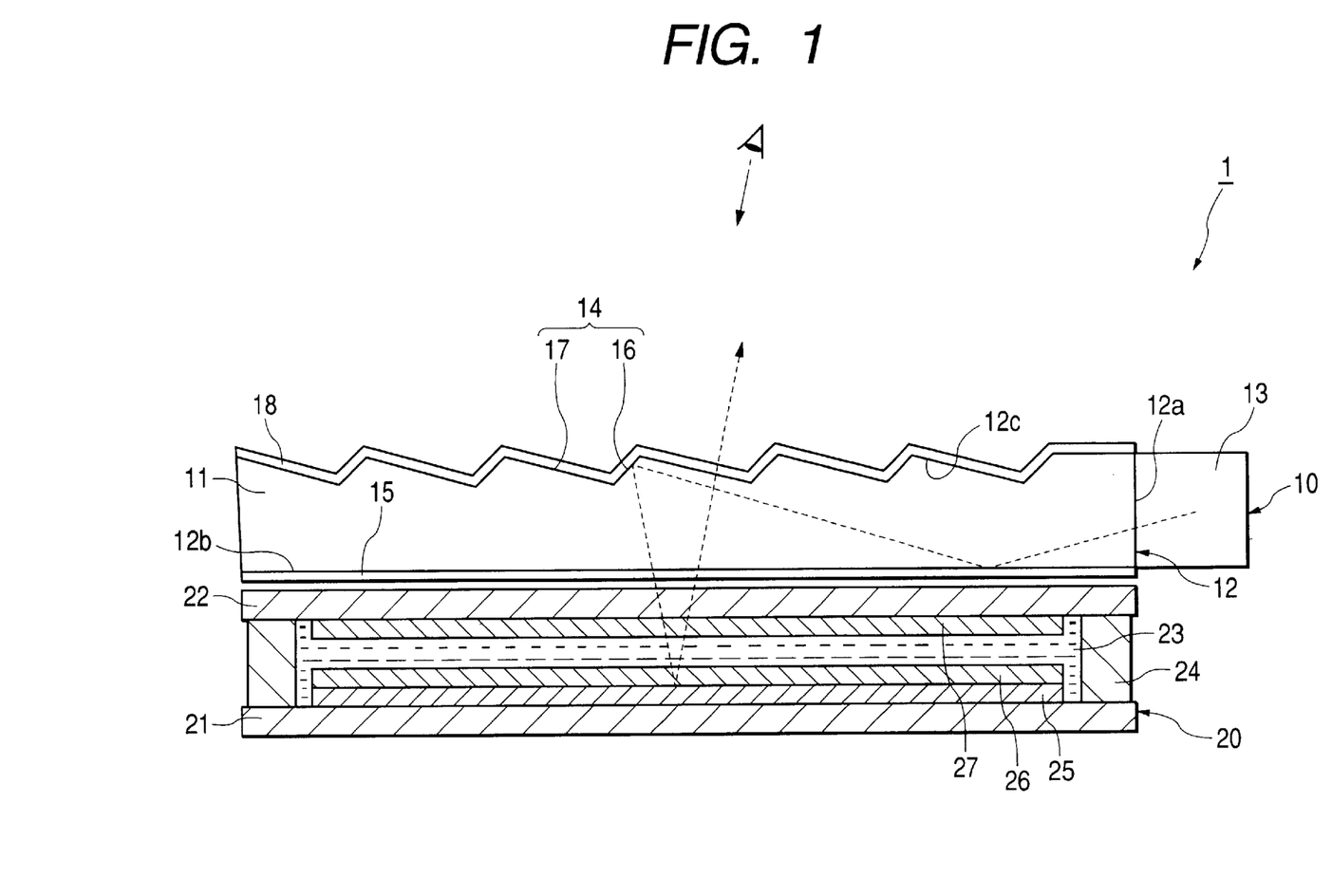
FIG. 1 shows a section of a liquid crystal display unit in a mode of implementing the present invention.

FIG. 1 shows a section of a liquid crystal display unit provided with a front light (surface emitting device) in a mode of implementing the present invention. In FIG. 1, the schematic configuration of a liquid crystal display unit 1 consists of a liquid crystal display unit 20 and a front light 10 arranged in front of this liquid crystal display unit 20 to illuminate the liquid crystal display unit 20. The front light 10 is composed of a transparent photo-conductor plate 12 and a light source 13, and the light source 13 is arranged on a side end face 12a for introducing light into the photo-conductor plate 12.

The photo-conductor plate 12, arranged on the front side (top face in FIG. 1) of the display area of the liquid crystal display unit 20 to irradiate the liquid crystal display unit 20 with light from the light source 13 is configured of a substrate 11 consisting of transparent acrylic resin or the like and transparent anti-reflection films 15 and 18 provided on the bottom and top faces of the substrate 11. As illustrated in FIG. 1, the bottom face (the face opposite the liquid crystal display unit 20) of the photo-conductor plate 12 is a light emission face 12b from which light to illuminate the liquid crystal display unit 20 is emitted, and the top face (external face of the photo-conductor plate 12) on the other side than this light emission face 12b is a reflection face 12c for altering the direction of the light propagating within the photo-conductor plate 12.

The material to constitute the substrate 11 of the photo-conductor plate 12 maybe selected from transparent resin materials including polycarbonate resin and epoxy resin besides acrylic resin, and glass. To cite a specific example, a suitable, though not the only, choice would be ARTON (trade name of a product available from JSR).

The light emission face 12b of the photo-conductor plate 12 is a surface which is arranged opposite the liquid crystal display unit 20 and from which light for illuminating the liquid crystal display unit 20 is emitted. It is a smooth surface of 10 nm or less in roughness (Ra). The anti-reflection film 15 is provided over this light emission face 12b to prevent light reflection.

In the reflection face 12c are formed a plurality of wedge-shaped grooves 14 in stripes, each consisting of a first slope 16 and a second slope 17 following this first slope 16, inclined with respect to the light emission face 12b to reflect the light propagating within the photo-conductor plate 12 and change its propagating direction. Out of the first slopes 16 and the second slopes 17 constituting the grooves 14, the first slopes 16 have a steeper angle of inclination. Also, the anti-reflection film 18 is provided over this reflection face 12c to prevent light reflection.

Although the reflection face 12c of the photo-conductor plate 12 shown in FIG. 1 is formed in a triangle wave shape consisting of a series of wedge-shaped grooves 14, it may as well consist of a series of trapezoids having a flat part substantially parallel to the light emission face 12b between each adjoining pair of grooves 14, a plurality of concave portions constituting part of a spherical surface, or a plurality of convex portions constituting part of a spherical surface formed on the reflection face 12c.

As the light source 13, a cold-cathode tube, an organic EL element, an LED, a combination of an LED and a rod-shaped photo-conductor or anything else that can uniformly irradiate the side end face 12a of the photo-conductor plate 12 with light can be suitably used.

The liquid crystal display unit 20 is composed by integrally joining with a sealing material 24 a first substrate 21 and a second substrate 22, both consisting of glass or the like, opposite to each other pinching a liquid crystal layer 23 between them. Over the face of the first substrate 21 toward the liquid crystal layer 23 are stacked a reflection layer 25 containing a metallic reflection film and a display circuit 26 in that order, and over the face of the second substrate 22 toward the liquid crystal layer 23 is formed a display circuit 27. Thus the liquid crystal display unit 20 is a reflectance liquid crystal display unit provided with the reflection layer 25 for reflecting light coming incident from outside.

The display circuits 26 and 27, though not shown, include electrode layers, consisting of transparent electroconductive films or the like, for driving the liquid crystal layer 23, and alignment layers or the like for controlling the alignment of the liquid crystal layer 23. In some cases, they may have color filters for color displaying.

The reflection layer 25 is configured, for instance, by sputtering a metallic reflection film consisting of aluminum, silver or the like over an organic film consisting of acrylic resin or the like having a rugged surface, and forming a flattening film consisting of silicone resin or the like to cover these reflection film and organic film. This reflection layer 25 may include a color filter, which, if it is to be included, should preferably be formed immediately above the reflection film. Since this configuration would allow the color filter to be arranged on the light reflection face, high grade color displaying would be made possible with reduced color shifts and parallax.

Now will be described with reference to FIG. 2 the shapes of the surface of the organic film formed over the reflection layer 25 of the liquid crystal display unit 20 and of the reflection film formed over the organic film.

Figure 2:
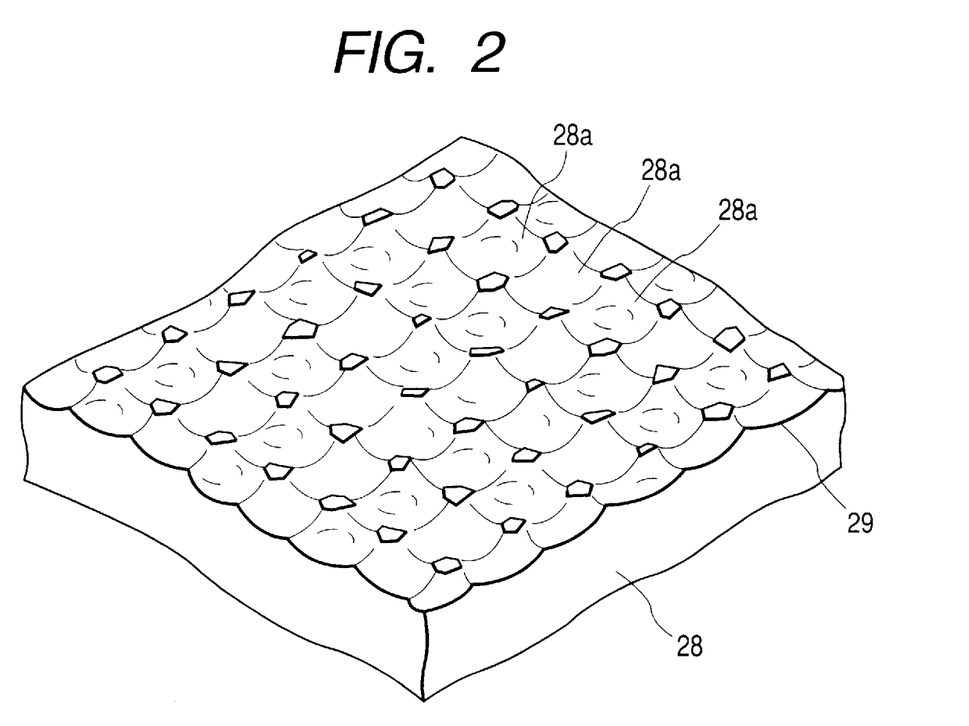
FIG. 2 shows an expanded perspective view of part of the reflection layer of the liquid crystal display unit according to the invention.

FIG. 2 shows an expanded perspective view of part of the organic film and the reflection film formed over the reflection layer 25 of the liquid crystal display unit 20. As illustrated in this drawing, many concave portions 28a each of which has an inner face constituting part of a sphere are formed on the surface of the organic film 28 overlapping one another, and over this organic film 28 is formed the reflection film 29.

The organic film 28 is formed by, after forming in a flat shape a resin layer consisting of photosensitive resin or the like over the substrate, pressure-fitting a transfer mold consisting of acrylic resin or the like and having an inversely rugged surface shape to the organic film 28 shown in FIG. 2, and then hardening the resin layer. The reflection film 29, formed over the surface of the organic film 28, is intended to reflect light coming incident on the liquid crystal display unit 20. It is formed by sputtering, vacuum vapor-depositing or subjecting to some other film formation process a metallic material having a high reflectance, such as aluminum or silver.

It is preferable for the concave portions 28a shown in FIG. 2 to be formed in random depths within the range of 0.1 $\mu$m to 3 $\mu$m, for the pitch of spacing between adjoining concave portions 28a to be set at random within the range of 5 $\mu$m to 100 $\mu$m, and for the inclination of the inner faces of the concave portions 28a to be set between −30 degrees and +30 degrees.

Points of particular importance are that the inclination of the inner faces of the concave portions 28a is set between −30 degrees and +30 degrees and that the pitch of spacing between adjoining concave portions 28a is set at random in all directions over the plane, because any regularity of the pitch of spacing between adjoining concave portions 28a would give rise to interference colors of light to color the reflected light. Or if the inclination of the inner faces of the concave portions 28a is out of the range of −30 degrees to +30 degrees, the diffusion angle of the reflected light will become too wide, and no bright display can be achieved (because the diffusion angle of the reflected light reaches or surpasses 36 degrees in the air, and the reflection intensity peak within the liquid crystal display unit drops, resulting in a large total reflection loss).

Or if the depth of the concave portions 28a is greater than 3 $\mu$m, the peaks of the convex portions cannot be fully covered by the flattening film when the concave portions 28a are to be flattened at a later step, and the desired degree of flatness cannot be achieved.

Where the pitch of spacing between adjoining concave portions 28a is less than 5 $\mu$m, there is a constraint on the fabrication of the transfer mold for use in forming the organic film 28, entailing the problems of an extremely long time taken for processing, impossibility to form an adequate shape for achieving the desired reflection characteristics and the generation of interference lights. Whereas the transfer mold for use in forming the surface shape of the organic film 28 is fabricated by transferring the surface shape of the matrix for the transfer mold produced by pressing many diamond indenters on a substrate of stainless steel or the like to silicone resin or the like, it is preferable for the tips of these diamond indenters to be between 30 $\mu$m and 200 $\mu$m in diameter for practical usefulness, and accordingly it is preferable for the pitch of spacing between adjoining concave portions 28a to be between 5 $\mu$m and 100 $\mu$m.

The liquid crystal display unit 20 can efficiently reflect and scatter light coming incident from outside because the reflection film 29 constituting the reflection layer 25 is shaped as described above, resulting in bright reflectance displaying and a wide angle of field of vision. This is due to the facts that the depth and pitch of the concave portions 28a shown in FIG. 2 are controlled within the respective ranges described above and that the inner faces of the concave portions 28a are spherical.

Thus, as the formation of the concave portions 28a in the controlled depth and pitch serves to keep the inclination angle of the inner faces of the concave portions 28a, which govern the reflection angle of light, it is made possible to control the reflection efficiency of the reflection film 29 within a certain range. Also, because the inner faces of the concave portions 28a are spheres which are symmetric in all directions, the reflection efficiency can be obtained in every direction of the reflection film 29. Thus, the display can be bright irrespective of the direction in which the observer sees it.

The liquid crystal display unit 1 configured as described above can use the front light 10, when it is turned on, for reflectance displaying besides using ambient light, such as sunlight or artificial illumination, for reflectance displaying.

Light introduced from the light source 13 of the front light 10 into the photo-conductor plate 12 via the side end face 12a of the photo-conductor plate 12 not only propagates within the photo-conductor plate 12 but also, reflected by the first slopes 16 constituting the grooves 14 which are formed on the reflection face 12c of the photo-conductor plate 12, is changed in propagating direction toward the light emission face 12b, and emitted from the light emission face 12b of the photo-conductor plate 12 to illuminate the liquid crystal display unit 20. Light coming incident on the liquid crystal display unit 20 passes the display circuits 26 and 27 and the liquid crystal layer 23 of the liquid crystal display unit 20, reaches the reflection layer 25, is reflected by the reflection film of this reflection layer 25, returns to outside the liquid crystal display unit 20, passes the photo-conductor plate 12 to be emitted from the reflection face 12c, and reaches the observer. In this way, the display on the liquid crystal display unit 20 is perceived by the observer.

It is preferable for the reflectance for light coming incident at an angle of not greater than 5 degrees on the light emission face 12b provided with the anti-reflection film 15 to be not more than 1% of the light reflectance of the Al film, because if the light reflectance at a wavelength of 550 nm surpasses 1%, reflected light generated on the light emission face 12b of the photo-conductor plate 12 and the reflection face 12c will reduce the contrast of the liquid crystal display unit 1.

It is further preferable for the reflectance of the anti-reflection films not to be more than 2.5% of the reflectance of the Al film in the region of 380 nm to 780 nm in optical wavelength, because if the reflectance of the anti-reflection films surpasses 2.5%, the fluctuations of reflectance in the visible light region will increase, with the result that much of light of a specific wavelength is reflected and the photo-conductor plate 12 is perceivably colored.

Also it is preferable for the reflectance of the anti-reflection films to be not more than 1.5% in the optical wavelength region of 450 nm to 700 nm, because such a configuration would enable the liquid crystal display unit 1 to give a white display of high luminance and color purity.

The light emission face 12b and the reflection face 12c of the photo-conductor plate 12 are provided with the anti-reflection films 15 and 18 for preventing the reflection of light coming incident on these faces from inside and outside the photo-conductor plate, and these anti-reflection films 15 and 18 enable the liquid crystal display unit 1 in this mode of implementing the invention to provide satisfactory perceptibility.

First will be described a case in which reflectance displaying is done by the liquid crystal display unit 1 shown in FIG. 1 using ambient light. As the anti-reflection film 18 is provided on the reflection face 12c of the photo-conductor plate 12, which constitutes the outermost face of the liquid crystal display unit 1 shown in FIG. 1, the reflectance of external light coming incident on this reflection face 12c can be kept low as described above. Thus, it is possible to prevent the perceptibility of the display on the liquid crystal display unit 1 from being significantly deteriorated by strong reflection of light in a specific direction by the reflection face 12c.

Light coming incident on the photo-conductor plate 12 from outside via the reflection face 12c passes the light emission face 12b to be incident on the liquid crystal display unit 20. As this light emission face 12b is also provided with the anti-reflection film 15, light reflected by the light emission face 12b can be kept at not more than 1% of light having a wavelength of 550 nm as stated above. Therefore, the light that is reflected by the light emission face 12b to return outside to deteriorate the perceptibility of the display on the liquid crystal display unit 1 can be reduced.

Since the liquid crystal display unit 1 according to the invention is provided with the front light 10 having the photo-conductor plate 12 which, by providing each face which is to transmit light with an anti-reflection film, can reduce the light reflected by each face, it can efficiently utilize ambient light to achieve reflectance displaying of satisfactory perceptibility.

Next will be described a case in which the front light 10 is turned on to perform displaying. In this case, light from the light source 13 propagating within the photo-conductor plate 12 shown in FIG. 1 is reflected by the slopes 16 to be altered in propagating direction and passes the light emission face 12b to come incident on the liquid crystal display unit 20. This light emission face 12b is provided with the anti-reflection film 15. Therefore, out of the quantity of light coming incident on the light emission face 12b, the part that is reflected by the light emission face 12b, passes the reflection face 12c and is emitted out to reach the observer can be reduced compared with the prior art.

Then, the light coming incident on the liquid crystal display unit 20 is reflected by the reflection layer 25 to come incident on the photo-conductor plate 12 again via the light emission face 12b. As the reflectance of this light passing the light emission face 12b is also kept at 1% or below by the anti-reflection film 15, the quantity of light reflected by the light emission face 12b to return to the liquid crystal display unit 20 can be reduced. Therefore, it is made possible to prevent such light as does not contribute to displaying from coming incident on the liquid crystal display unit 20 and inviting white dimming or any other trouble.

Next, whereas the light coming incident on the photo-conductor plate 12 from the liquid crystal display unit 20 side via the light emission face 12b passes the reflection face 12c to reach the observer, this light, when passing the reflection face 12c, is also reflected by the reflection face 12c to generate light that returns to inside the photo-conductor plate 12. Since this returning light, too, can be reduced by the anti-reflection film 18 provided on the reflection face 12c, it is made possible to prevent light making no contribution to displaying from remaining within the front light 10 or the liquid crystal display unit 20 and adversely affecting perceptibility.

Thus, the liquid crystal display unit 1 according to the invention can provide high grade displaying excelling in perceptibility whether reflectance displaying uses ambient light or uses the front light 10 that is turned on for the purpose.

Figure 3A:
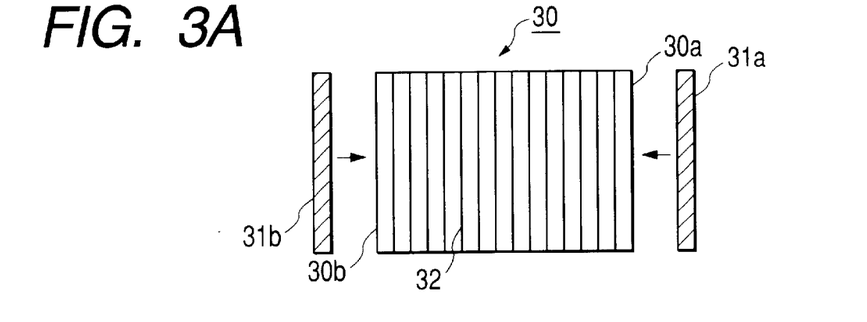
FIG. 3A through FIG. 3C are configurational diagrams showing an example of a formation method for anti-reflection films according to the invention.
Figure 3B:
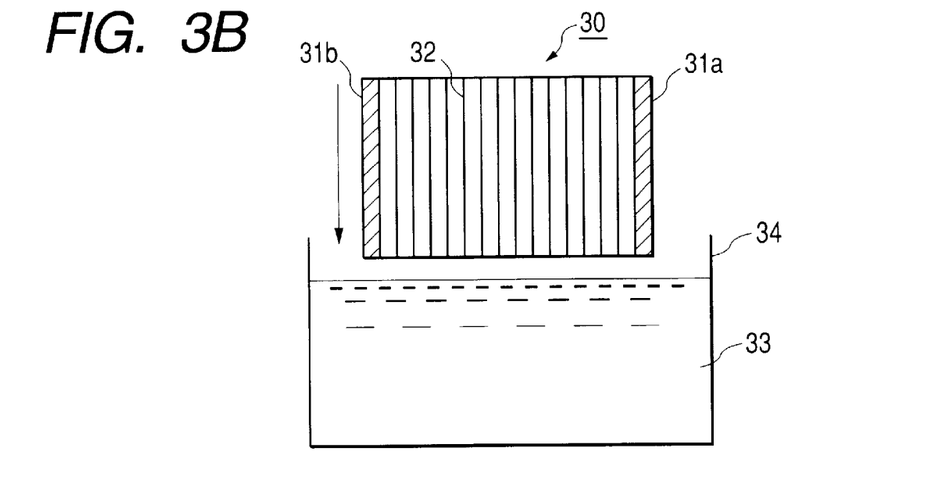
Figure 3C:
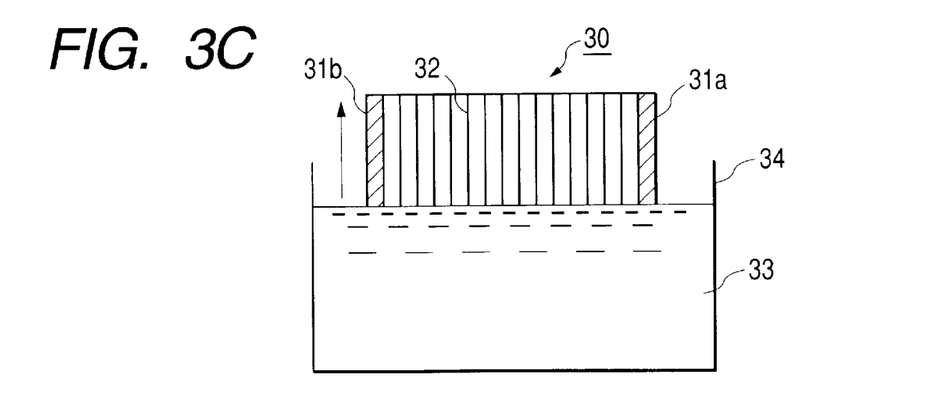

The anti-reflection films 15 and 18 of the photo-conductor plate 12 can be formed by dip coating. One example of anti-reflection film formation by dip coating will be described with reference to FIGS. 3A–C. FIGS. 3A–C are process diagrams illustrating one example of formation method for anti-reflection films according to the invention, wherein FIGS. 3A through 3C show steps of the process in that order.

First, as shown in FIG. 3A, side end faces 30a and 30b of a substrate 30 fabricated by injection molding of a resin material, such as transparent acrylic resin or polycarbonate resin, are respectively provided with masks 31a and 31b, composed of triacetate or the like, to prevent an anti-reflection film from being formed on the side end face 30a. A plurality of wedge-shaped grooves 32 are formed in one face of the substrate 30 in stripes, and the other face than that in which the grooves 32 are formed, though not shown, is flat. The side end face 30a is also flat.

Then, as shown in FIG. 3B, while supporting one end of this substrate 30, the substrate 30 is placed in a vessel 34 filled with a resin solution 33 for forming anti-reflection films. Next, this substrate 30 is held for 1 to 5 minutes in a state of being wholly immersed in the resin solution 33. For this resin solution 33, a suitable, though not the only, choice may be CYTOP (trade name of a product available from ASAHI GLASS).

Then, as shown in FIG. 3C, the substrate 30 is lifted toward the upper part of the vessel 34 at a rate of 150 mm/min to 300 mm/min. It is preferable for this lifting to be accomplished while supporting the substrate 30 in such a manner that the lengthwise direction of the wedge-shaped grooves 32 formed in strips in one face of the substrate 30 is parallel to the lifting direction. If lifting is done in a direction orthogonal to the lengthwise direction of the grooves 32, the resin solution 33 will accumulate on the convex portions between adjoining grooves 32 to make uneven the thickness of the anti-reflection film that is formed.

Figure 4:
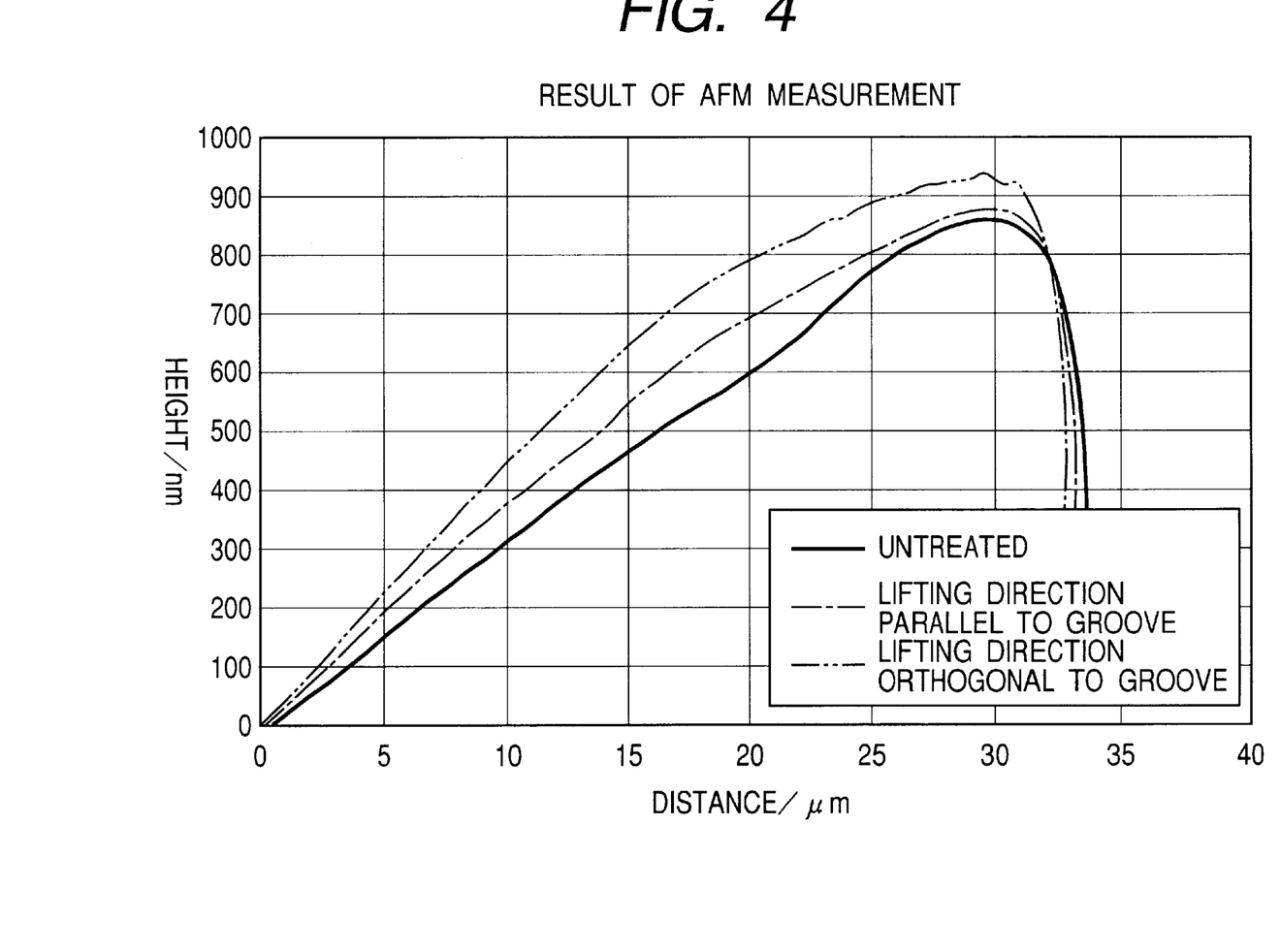
FIG. 4 is a graph showing a result of measurement of the film thickness distribution of the anti-reflection films by atomic force microscopy (AFM).
Figure 5:
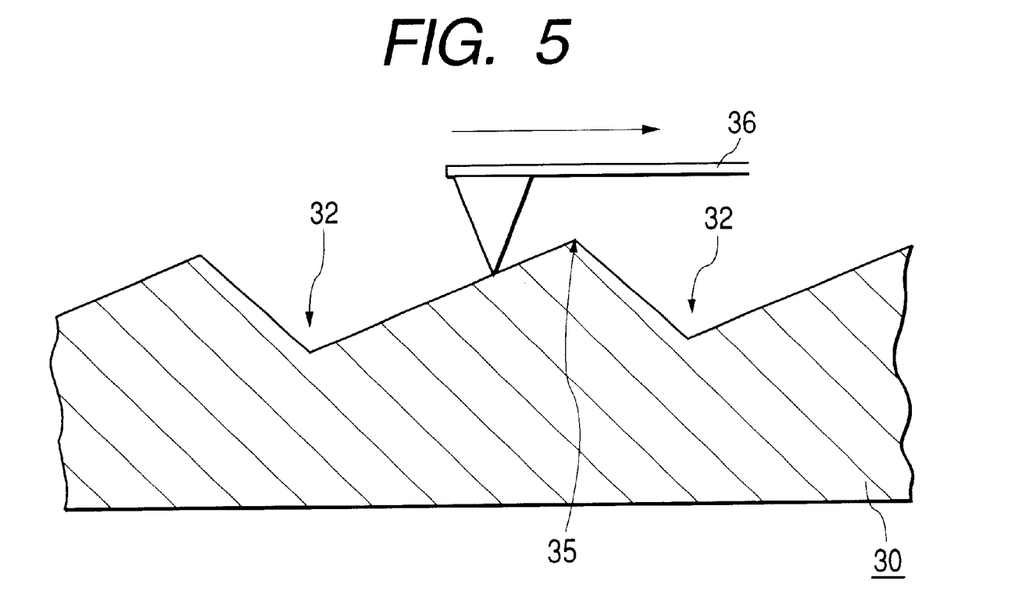
FIG. 5 illustrates an example of a method of measuring the thickness of the anti-reflection films of the photo-conductor plate.

FIG. 4 illustrates the result of measurement of the anti-reflection film thickness by atomic force microscopy (AFM) of photo-conductor plates over anti-reflection films were actually formed by lifting in different lifting directions. The AFM measurement was performed by scanning with an AFM probe 36 the vicinities of the peaks of convex portions 35, whose section is partially shown in FIG. 5, formed between adjoining grooves 32 in the substrate 30.

The solid curve in FIG. 4 represents the shape of the convex portions 35 of the substrate 30 where no anti-reflection film is formed. The one-dot chain curve in FIG. 4 represents the result of measurement of an anti-reflection film formed by lifting the substrate 30 from the resin solution 33 in a direction parallel to the lengthwise direction of the grooves 32, while the two-dot chain curve represents the result of measurement of an anti-reflection film formed by lifting the substrate 30 in a direction orthogonal to the lengthwise direction of the grooves 32. Therefore, the differences of these one-dot and two-dot chain curves from the solid curve indicate the thicknesses of the anti-reflection films formed on the substrate 30.

As illustrated here, compared with the anti-reflection film formed by lifting in the direction parallel to the lengthwise direction of the grooves 32 (the two-dot chain curve), the anti-reflection film formed by lifting in the direction orthogonal to the lengthwise direction of the grooves 32 (one-dot chain curve) has a greater overall thickness, and is especially thick in the parts of the slope close to the peaks of the convex portions 35, therefore inferior in evenness.

Next, the substrate 30 coated with the resin solution 33 at the foregoing step is dried by putting it into an oven heated to between 70° C. to 90° C. This results in drying and solidification of the resin solution 33 covering the substrate 30 to form an anti-reflection film. Then, the masks 3a and 3b are removed to provide a photo-conductor plate in which an anti-reflection film is formed on every face of the substrate 30 except the side end face 30a.

The above-described production method enables an extremely thin anti-reflection film, 0.1 μm or so, to be uniformly over an uneven face, such as the face of the substrate 30 in which the wedge-shaped grooves 32 are formed as shown in FIG. 3A. Therefore, as this method makes it possible to provide a plurality of faces of the substrate with anti-reflection films, a photo-conductor plate excelling in light transmittance can be fabricated. Moreover, as the anti-reflection films can be formed simultaneously over a plurality of faces, the manufacturing process can be simplified, with corresponding reduction in the manufacturing cost of photo-conductor plates.

The above-described production method also allows anti-reflection films to be structured in a single layer, because the light transmittance of the anti-reflection films according to the invention is equal to, or even higher than, that of a multi-layered anti-reflection film according to the prior art. Thus, as the anti-reflection film formed by dip coating is extremely thin and uniform, it can exert particularly high light transmittance. However, it is of course permissible to use a multi-layered structure in some cases, and in such cases the structure can be formed by uniformly stacking very thin layers.

Further, by configuring a front light using a photo-conductor plate fabricated by the above-described production method and arranging it on the front side of a liquid crystal display unit, the excellent light transmittance of the photo-conductor plate can provide a liquid crystal display unit with satisfactory perceptibility of display, because the displaying by the liquid crystal display unit transmitted by the photo-conductor plate is satisfactory and the front light can efficiently illuminate the liquid crystal display unit.

Preferred Embodiments

Embodiment 1

First, by performing injection molding with ARTON (trade name of a product available from JSR) as the material, a substrate in which a plurality of wedge-shaped grooves were formed in stripes all over was fabricated. The face in which the wedge-shaped grooves are formed is the reflection face of this substrate, and the other face is the light emission face. The refractive index of this substrate was 1.52.

Next, masks were arranged on the side end faces of the photo-conductor plate to cover these faces and, after soaking this substrate in CYTOP (trade name of a product available from ASAHI GLASS), it was lifted at a rate of 210 mm/min and coated with the aforementioned solution. Then, this substrate was dried for one hour in an oven heated to 90° C. to fabricate a photo-conductor plate by forming anti-reflection films of 0.1 μm in thickness over the surface of the substrate. The refractive index of these anti-reflection films of the photo-conductor plate was 1.34.

Then, after removing the masks on the side end faces of the photo-conductor plate, a light source equipped with a white LED was arranged on a side end face of the photo-conductor plate to configure a front light, and a liquid crystal display unit was produced by arranging this front light on the front side of the reflectance liquid crystal display unit.

In a state in which the front light of the liquid crystal display unit is not turned on, the reflectance at the time when reflected light from the liquid crystal display unit passes the photo-conductor plate where the angle of incident on the liquid crystal display unit was 30 degrees and the angle of observation was 0 degree was measured with LCD-7000 (trade name of a product available from OTSUKA ELECTRONICS). The reflectance ratio between black displaying and white displaying of the liquid crystal display unit was calculated on the basis of the result of measurement to be used as the contrast ratio. The contrast ratio of the liquid crystal display unit of this embodiment based on this measurement was 13.

Figure 6:
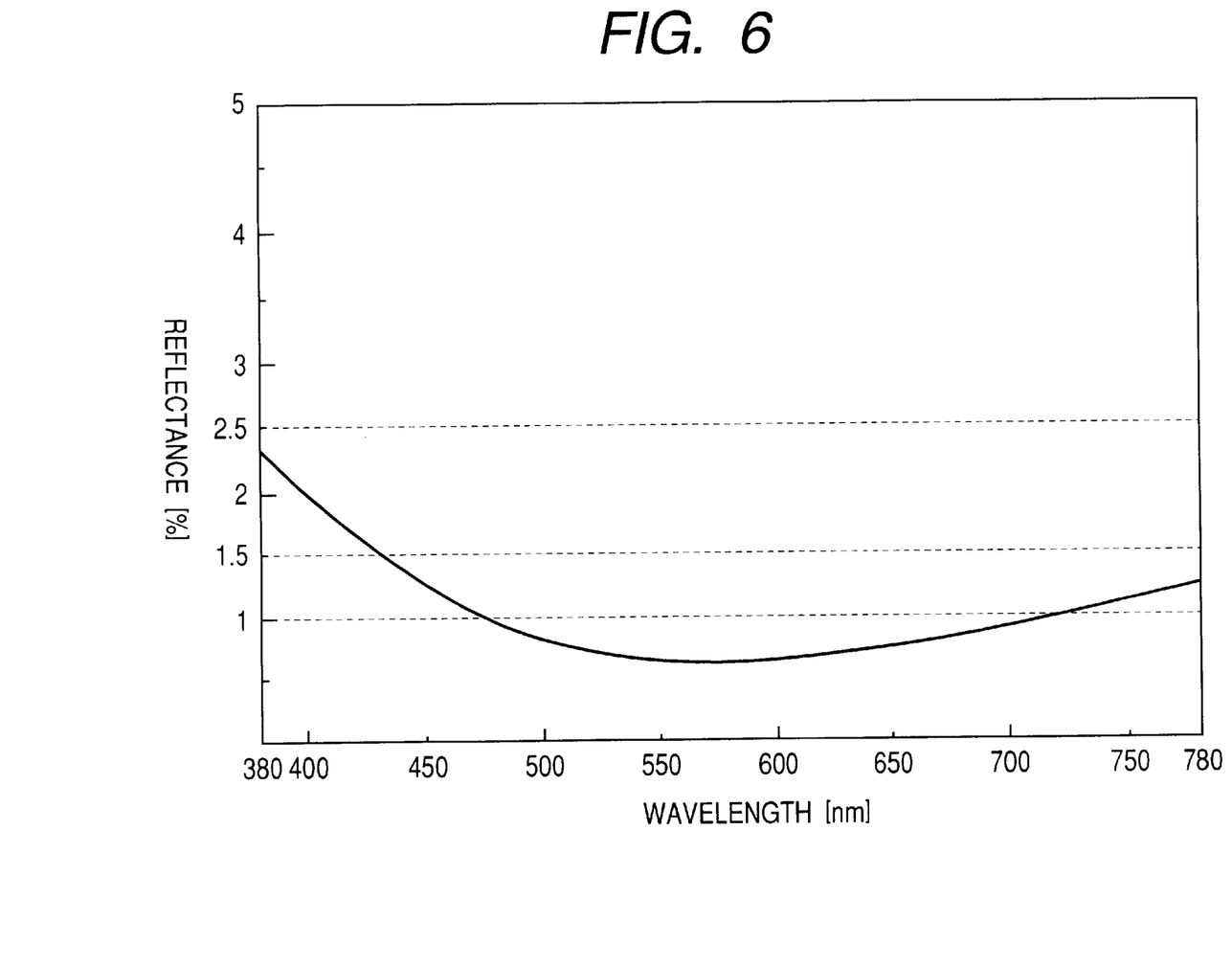
FIG. 6 shows a result of measurement of the reflectance of the anti-reflection films of Embodiment 1 of the invention.

Next, the light emission face of the photo-conductor plate was irradiated with light, and its reflectance was measured with a spectroscope. The result is shown in FIG. 6, in which the horizontal axis represents the optical wavelength and the vertical axis, the reflectance of light of the corresponding wavelength on the horizontal axis. It is to be noted that the reflectance on the vertical axis is expressed in % of the reflectance of an Al film. As shown in FIG. 6, the reflectance of the anti-reflection films of the photo-conductor plate embodying the invention in this manner was 1% or less of the reflectance of the Al film at an optical wavelength of 550 nm, and 2.5% or less of the reflectance of the Al film in a wavelength region of 380 nm to 780 nm. It was 1% or less of the reflectance of the Al film in a wavelength region of 500 nm to 700 nm, and 1.5% or less of the reflectance of the Al film in a wavelength region of 450 nm to 700 nm.

Embodiment 2

Next, at the step for forming anti-reflection films over a substrate fabricated by the same method as that for Embodiment 1, photo-conductor plates were produced, each by forming the anti-reflection films so that its reflectance at an optical wavelength of 550 nm be 0.6%, 0.9%, 1.45%, 2.3% or 4.3% of the Al film by varying the combination of the material and thickness of the film in a vapor deposition process. A photo-conductor plate whose reflectance is 4.3% out of the reflectance ratios mentioned above has no anti-reflection films formed over it. Then, using these photo-conductor plates, liquid crystal display units were fabricated in the same manner as for Embodiment 1.

Figure 7:
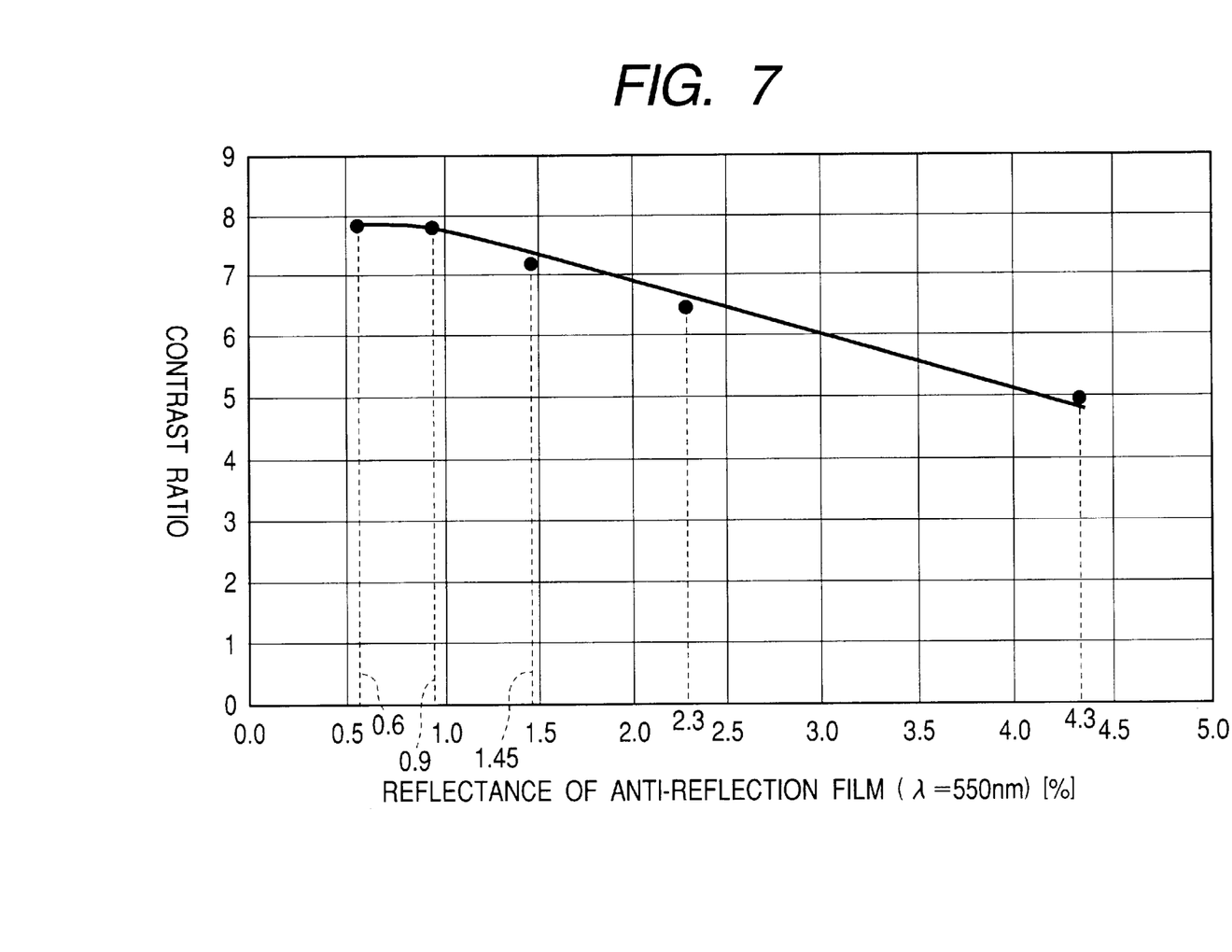
FIG. 7 shows a result of measurement of the contrast ratio of the liquid crystal display unit of Embodiment 2 of the invention.

The result of measurement of the contrast ratios of these liquid crystal display units with BM5 (trade name of a product available from TOPCON) is shown in FIG. 7, wherein the horizontal axis represents the reflectance of the anti-reflection films and the vertical axis, the contrast ratios of the liquid crystal display units provided with the respective photo-conductor plates. Each of these contrast ratios refers to the luminance level of the liquid crystal display unit in the normal direction in black displaying and white displaying by the liquid crystal display unit measured in a state in which the front light is on.

As illustrated in FIG. 7, if the reflectance of the anti-reflection films at an optical wavelength of 550 nm is not more than 1%, the contrast ratio of the liquid crystal display unit will show a high level of or above 7.7, but if the reflectance surpasses 1%, the contrast ratio will gradually drop, down to 5 at a reflectance of 4.3%. Thus, if the reflectance of the anti-reflection films is not more than 1% of that of the Al film, it will be possible to increase the contrast ratio of the liquid crystal display unit by preventing the white dimming of the display which would result from light generated by the reflection on the light emission face when reflected light from the liquid crystal display unit passes the photo-conductor plate and reaches the observer.

Comparative Example 1

Next, as Comparative Example 1, a liquid crystal display unit was produced, in the same way as for Embodiment 1 except that an anti-reflection film was formed only on the light emission face, by arranging masks on side end faces and reflection faces of a substrate fabricated by injection molding and then forming an anti-reflection film.

The front light of this liquid crystal display unit was turned on and displaying was performed. The contrast measured in the same manner as for Embodiment 1 was found to be 8.

Comparative Example 2

Then, as Comparative Example 2, a photo-conductor plate using commercially available anti-reflection films was produced. First, a substrate in which wedge-shaped grooves were formed in stripes all over was fabricated by an injection molding process using Delpet (trade name of a product available from Asahi Kasei), which is an acrylic resin. The face in which the wedge-shaped grooves are formed is the reflection face of this substrate, and the other face is the light emission face. The refractive index of this substrate was 1.49.

Next, a photo-conductor plate was produced by sticking an anti-reflection film to the light emission face of the substrate. The anti-reflection film that was used was a commercially available one having a refractive index of 1.38.

Then, a light source equipped with a white LED was arranged on a side end face of the photo-conductor plate to configure a front light, and a liquid crystal display unit was produced by arranging this front light on the front side of the reflectance liquid crystal display unit.

The front light of this liquid crystal display unit was turned on and displaying was performed. The contrast measured in the same manner as for Embodiment 1 was found to be 8.

The results obtained with these Embodiment 1, Comparative Example 1 and Comparative Example 2 have revealed that a liquid crystal display unit equipped with a front light using a photo-conductor plate provided with anti-reflection films both on the emission and reflection faces according to the invention excels in contrast.

As hitherto described in detail, the photo-conductor plate according to the present invention is provided with a substrate having a light emission face for emitting light introduced within via a side end face and a reflection face, positioned on the other side than the light emission face, for reflecting light propagating inside, and anti-reflection films provided over surfaces of the substrate, wherein the anti-reflection films are provided over at least the light emission face and the reflection face. Accordingly, it can exert excellent light transmittance by restraining the reflection of light coming incident on the light emission face and the reflection from inside or outside the photo-conductor plate.

Further, by keeping the reflectance of the anti-reflection films of the photo-conductor plate according to the invention at 1% or less of the reflectance of an Al film at an optical wavelength of 550 nm, a photo-conductor plate excelling in light transmittance can be provided, and accordingly the contrast ratio of displaying can be prevented from deteriorating in a liquid crystal display unit wherein the photo-conductor plate is arranged on the front side to perform displaying with transmission by the photo-conductor plate.

Or, by keeping the reflectance of the anti-reflection films at 2.5% or less of the reflectance of the Al film in an optical wave length region of 380 nm to 780 nm, it is made possible to prevent the phenomenon in which light of a specific wavelength is significantly reflected and the photo-conductor plate 12 is perceivably colored.

Or, by keeping the reflectance of the anti-reflection films at 1.5% or less of the reflectance of the Al film in an optical wave length region of 450 nm to 700 nm, it is made possible to keep the intensities of lights passing the photo-conductor plate in a broad wavelength region, and accordingly displaying at high luminance and color purity is made possible.

Next, by keeping the refractive index of the substrate of the photo-conductor plate according to the invention at 1.48 or more and the refractive index of the anti-reflection films at 1.35 or less, light propagating within the photo-conductor plate can be confined within the photo-conductor plate, and accordingly the propagation loss of light can be suppressed to enhance the efficiency of the light source.

Then, by structuring the anti-reflection films of the photo-conductor plate according to the invention in a single layer, the structure of the anti-reflection films can be simplified with a corresponding reduction in manufacturing cost.

Particularly if the anti-reflection films of the photo-conductor plate according to the invention are formed by dip coating, anti-reflection films can also be formed on the reflection face of the photo-conductor plate where grooves and other rugged elements are formed, so that the light transmittance of the photo-conductor plate can be enhanced tremendously.

Next, a photo-conductor plate production method according to the invention comprises a step of soaking a flat substrate on one of whose faces are formed wedge-shaped grooves in stripes in a resin solution containing a resin material to constitute an anti-reflection film and lifting the substrate from the resin solution thereby to coat the substrate with the resin solution, and a step of drying the substrate to form an anti-reflection film on its surface, wherein the direction in which the substrate is lifted from the resin solution is parallel to the grooves in the substrate, and accordingly the anti-reflection film can be formed uniformly even over the face in which the grooves are formed. Moreover, as the anti-reflection films can be formed simultaneously over a plurality of faces, the manufacturing process can be simplified, with a corresponding reduction in manufacturing cost.

Next, as a surface emitting device according to the invention is provided with a photo-conductor plate according to the invention and a light source arranged on one side end face of the photo-conductor plate, highly efficient illumination is made possible by virtue of the high light transmittance of the photo-conductor plate.

Also, a liquid crystal display unit according to the invention is provided with a surface emitting device according to the invention, light from the light source of the surface emitting device can be efficiently used for illuminating the liquid crystal display unit, and at the same time the high light transmittance of the photo-conductor plate can prevent the contrast ratio of displaying from deteriorating wherein displaying is to be performed with transmission by the surface emitting device.

What is claimed is:

1. A photo-conductor plate comprising:
    a substrate having a side end face through which light is introduced into the substrate, a light emission face to emit light that propagates inside the substrate and a reflection face to reflect the light propagating inside, and
    anti-reflection films disposed on at least the light emission face and reflection face,
    wherein reflectance of the anti-reflection films is not more than 2.5% of reflectance of an Al film in an optical wavelength region of 380 nm to 780 nm.

2. The photo-conductor plate, according to claim 1, wherein the reflection face comprises a plurality of slopes to reflect the light propagating within the substrate and alter a propagating direction of the light.

3. The photo-conductor plate, according to claim 1, wherein the reflectance of the anti-reflection films is not more than 1% of the reflectance of the Al film at an optical wavelength of 550 nm.

4. The photo-conductor plate, according to claim 1, wherein the reflectance of the anti-reflection films is not more than 1.5% of the reflectance of the Al film in an optical wavelength region of 450 nm to 700 nm.

5. The photo-conductor plate, according to claim 1, wherein a refractive index of the substrate is not less than 1.48 and a refractive index of the anti-reflection films is not more than 1.35.

6. The photo-conductor plate, according to claim 1, wherein the anti-reflection films are formed by a dip coating method.

7. The photo-conductor plate, according to claim 6, wherein the anti-reflection films are a single-layered structure.

8. A liquid crystal display unit comprising a surface emitting device having the photo-conductor plate of claim 1.

* * * * *

UNITED STATES PATENT AND TRADEMARK OFFICE
CERTIFICATE OF CORRECTION

PATENT NO. : 6,693,683 B2
DATED : February 17, 2004
INVENTOR(S) : Yoshihiko Ishitaka It is certified that error appears in the above-identified patent and that said Letters Patent is hereby corrected as shown below:

Column 14,
Line 41, after claim 8, insert the following claims.

9. A surface emitting device comprising the photo-conductor plate of Claim 1 and a light source arranged on an incident end face of the photo-conductor plate.

10. The surface emitting device, according to Claim 9, wherein, in the photo-conductor plate, the reflection face comprises a plurality of slopes to reflect the light propagating within the substrate and alter a propagating direction of the light.

11. The surface emitting device, according to Claim 9, wherein, in the photo-conductor plate, a reflectance of the anti-reflection films is not more than 1% of a reflectance of the Al film at an optical wavelength of 550 nm.

12. The surface emitting device, according to Claim 11, wherein, in the photo-conductor plate, the reflectance of the anti-reflection films is not more than 2.5% of the reflectance of the Al film in an optical wavelength region of 380 nm to 780 nm.

13. The surface emitting device, according to Claim 12, wherein, in the photo-conductor plate, the reflectance of the anti-reflection films is not more than 1.5% of the reflectance of the Al film in an optical wavelength region of 450 nm to 700 nm.

14. The surface emitting device, according to Claim 9, wherein, in the photo-conductor plate, a refractive index of the substrate is not less than 1.48 and a refractive index of the anti-reflection films is not more than 1.35.

15. The surface emitting device, according to Claim 9, wherein, in the photo-conductor plate, the anti-reflection films are formed by a dip coating method.

16. The surface emitting device, according to Claim 15, wherein, in the photo-conductor plate, the anti-reflection films are a single-layered structure.

Signed and Sealed this

Fourteenth Day of September, 2004

JON W. DUDAS
*Director of the United States Patent and Trademark Office*